United States Patent [19]

Tribbey et al.

[11] Patent Number: 4,864,276

[45] Date of Patent: Sep. 5, 1989

[54] VERY LOW-PROFILE MOTOR ARRANGEMENT FOR RADIO PAGER SILENT ALERTING

[75] Inventors: David A. Tribbey; Charles W. Mooney, both of Lake Worth; Thomas J. Rollins, Boca Raton, all of Fla.

[73] Assignee: Motorola, Inc., Schaumburg, Ill.

[21] Appl. No.: 202,331

[22] Filed: Jun. 3, 1988

[51] Int. Cl.⁴ .......................... G08B 5/22; H04Q 1/30
[52] U.S. Cl. .............................. 340/407; 340/825.46; 340/311.1; 340/404
[58] Field of Search ................ 340/407, 311.1, 825.44, 340/825.46, 404; 455/90

[56] References Cited

U.S. PATENT DOCUMENTS

| | | |
|---|---|---|
| 3,017,631 | 1/1962 | Fink et al. |
| 3,618,070 | 11/1971 | Kagan ............................... 340/311.1 |
| 3,623,064 | 11/1971 | Kagan ............................... 340/311.1 |
| 3,911,416 | 10/1975 | Feder ................................. 340/311.1 |
| 4,352,091 | 9/1982 | Yamasaki ......................... 340/311.1 |

Primary Examiner—Donnie L. Crosland
Attorney, Agent, or Firm—William E. Koch; Vincent B. Ingrassia

[57] ABSTRACT

A low-profile motor arrangement for accomodation in a low-volume electronic device such as a radio pager. The motor is designed to provide a vibrating action for silent alerting that does not require any additional add-on parts, but effects the required vibrator action by a designed-in unbalance in the rotating internal parts.

16 Claims, 3 Drawing Sheets

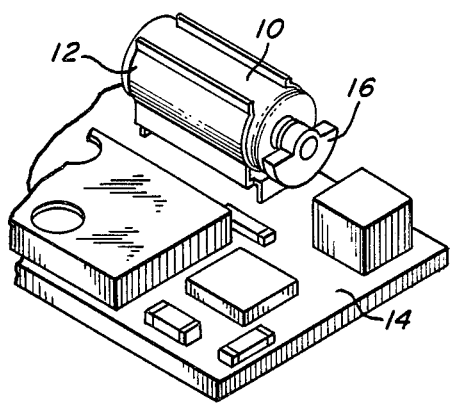
FIG. 1 —PRIOR ART—
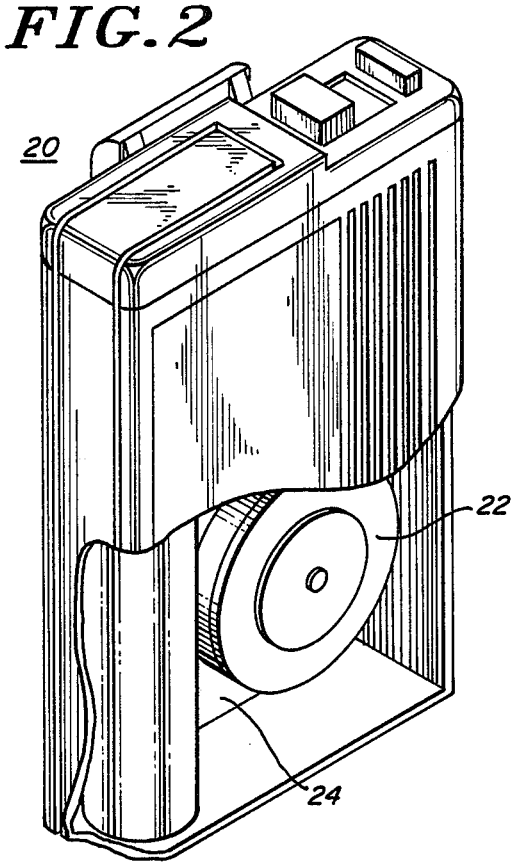
FIG. 2
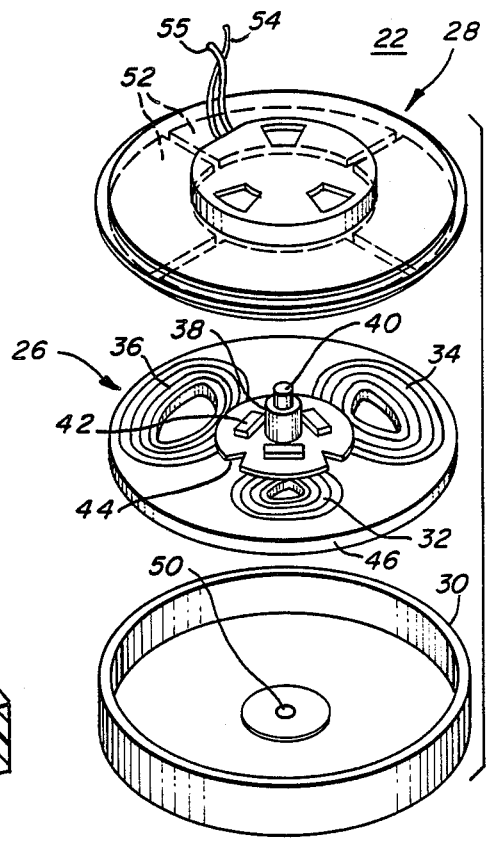
FIG. 3
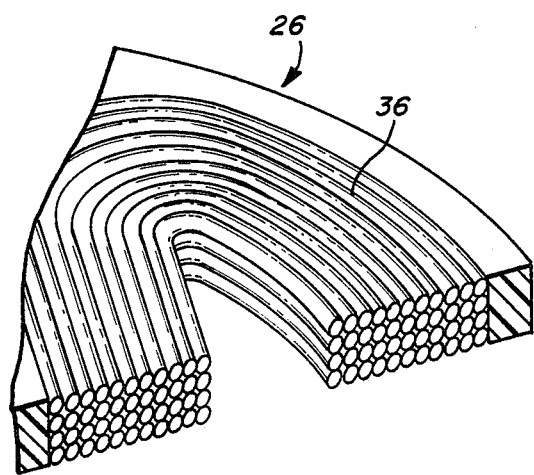
FIG. 4

VERY LOW-PROFILE MOTOR ARRANGEMENT FOR RADIO PAGER SILENT ALERTING

BACKGROUND OF THE INVENTION

The present invention relates in general to radio pagers with silent alerting and, more particularly, to a very low-profile vibrator motor suitable for use with such pagers which exhibits substantial space saving characteristics, high reliability and completely silent operation.

Radio pagers with vibrator motors effecting selective silent alerting are of course known in the art. Instead of emitting an audible beep or tone upon the receipt of the proper selective call or page, the decoder circuits of these pagers activate an associated vibrator motor which alerts the wearer by tactile response that a call has in fact been received and decoded. Up to a few years ago, effecting the required silent alerting was readily accomplished by the vibrator motors then available in the market place. Such motors generally comprise a conventionalized structure having a cylindrical housing wherein a rotating shaft having a longitudinal axis of significant length to which an external but unbalanced counter weight was attached. By "significant length" it is meant that the rotating shaft is equal to or greater than the diameter of the motor. For example, reference is made to an early U.S. pat. No., 3,017,631 to Fink, et al., issuing in 1962. Further, two U.S. Pat. Nos. 3,618,070 and 3,623,064 issuing to Sholly Kagan in 1971 are also illustrative. U.S. Pat. No. 3,911,416 to Feder in 1975, assigned to the assignee of the present invention, is still another variation. See also FIG. 2 of the drawings herein as a typical example of such conventional vibrator motors. The motor 10 in FIG. 2 is included in a holder 12 which is mounted directly to the pager's printed circuit board 14. Included on the rotating shaft of the motor 10 is an eccentric counter weight 16.

Structures of this sort as above referenced may well be accommodated in pagers that have significant volume. That is simply not the case in present day pagers which have been steadily reducing in available volume while at the same time increasing in circuit complexity and included options, such as alphanumeric displays, memory devices for storing multiple calls, and the like. In short, space is being reduced and is at a decided premium for significant and desirable operational features such that vibrating motors presently in the art cannot be justified or accommodated. Moreover, with the vibrating motors mounted directly to the PC board, serious risk is engendered regarding optimum reliability standards because the vibration generated may well affect solder joints, fragile component parts, and the like on the PC board. Vibration levels for these motors may approach four G's or higher.

One other problem needs be addressed regarding these prior vibrator motor devices, namely, the usually unacceptable level of noise that is generated. When the silent alerting mode is selected by a radio pager user/wearer, it somewhat defeats the purpose if, in activating the silent alert, an audible whine or other sound is produced that may be heard by others in the vicinity. What is desired is an alerting arrangement which, when activated, is sensed only by the wearer of the device and not heard by others.

What is needed then is a miniaturized motor that may be easily and effectively accommodated into present day radio pagers, even those designated as "credit card" pagers, which will silently alert on the wearer of such pager without jeopardizing the reliability standards of the pager by the resulting vibration generated over the expected service life of the pager.

SUMMARY OF THE INVENTION

Accordingly, it is an object of the present invention to provide an improved vibrator motor for effecting silent alerting in radio pagers and which overcomes the foregoing deficiencies of prior structures.

A more particular object of the present invention is to provide an improved vibrator motor of the foregoing type which requires no external, add-on counter weight and which has an extremely low-profile configuration to permit accommodation in any radio pager.

In practice, the invention includes a low-profile vibrator motor for effecting silent alerting in a low volume radio pager. The motor includes rotor and stator members, the rotor having a longitudinal dimension substantially less than its diameter and is rotatable with respect to the stator. The motor is designed to include a plurality of electromagnetic windings on one of the rotor or stator members, with one or more permanent magnets on the other thereof. The rotor is designed with a permanent unbalance therein to provide a substantial vibrating action when rotated at its intended operating speed. Soft iron members are arranged to contain the magnetic flux developed by the required permanent magnets to within the interior of the motor.

In one embodiment, a DC motor is provided with a rotor containing the armature and electromagnetic windings with the stator designed to carry a plurality of permanent magnets. One of the windings on the rotor is made substantially smaller to create the desired unbalance. In still another embodiment, the electromagnetic windings are printed on a printed circuit board acting as the stationary stator. A permanent magnet is affixed to a soft iron plate or yolk, forming one portion of the rotor, and another soft iron plate or yolk is positioned above the permanent magnet a given distance to form the other portion of the rotatable rotor. The PC board with a plurality of electromagnetic windings is positioned within the gap between the magnet and the upper, back yolk. One or more of the magnet(s) and upper and lower yolks have portions removed from the periphery thereof to effect the desired unbalance and the resulting vibrating action when rotated at operating speed.

Either of these flat, low-profile vibrating motor embodiments may be readily accommodated on the interior cover of the radio pager and not on the associated printed circuit board with the associated electronic components thereon to thereby enhance the pager reliability over its expected service life. An acoustic enclosure may also be utilized covering the vibrator motor so as to ensure complete silent alerting.

BRIEF DESCRIPTION OF THE DRAWINGS

The features of the present invention, which are believed to be novel are set forth with particularity in the appended claims. The invention itself, however, together with further objects and advantages thereof, may be best understood by reference to the accompanying drawings, in which:

FIG. 1 is a fragmentary view in perspective of a prior art pager having a typical vibrating motor attached thereto;

FIG. 2 is a partially broken away view in perspective of a radio pager having a vibrator motor attached to the interior cover thereof, which motor has been constructed in accordance with the present invention;

FIG. 3 is an exploded view of the vibrator motor of FIG. 2;

FIG. 4 is an enlarged view in perspective of a portion of the rotor of FIGS. 2 and 3;

BRIEF DESCRIPTION OF THE PREFERRED EMBODIMENT

Figure 5:
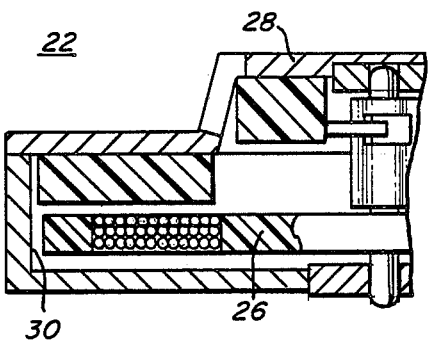
FIG. 5 is a cross-sectional view of the motor of FIGS. 2, 3 and 4, including its integral housing.

Referring now to the drawings, a radio pager receiver is shown at 20, which pager includes a flat, low-profile vibrator motor 22 mounted on the interior of rear wall 24 of the pager. Motor 22 has been constructed in accordance with the present invention and is further illustrated in FIGS. 3-6. An exploded view thereof is shown in FIG. 3. Motor 22 includes an annular rotor assembly 26, a stator assembly 28, which also forms the cover for a housing 30. Rotor assembly 26 includes a plurality of electromagnetic windings 32, 34 and 36, as well as an armature 38 on a shaft 40. Chip capacitors 42 are arranged about the armature 40 on a disk 44. Further, windings 32, 34 and 36 are partially encapsulated by a suitable thermal plastic material to form a flat disk 46, best seen in FIG. 4.

Shaft 40 of rotor assembly 26 is rotatably accommodated within bearing 50 included in housing 30. The top of shaft 40 fits into a similar bearing (not specifically shown) in the stator/cover assembly 28. Stator 28 includes a plurality of curved permanent magnets shown in dotted line at 52. Stator 28 also includes the associated brushes (also not specifically shown) for cooperation with armature 38.

Motor 22 operates in an entirely conventional manner such that further and more extensive operational description should not be necessary. Operating power, or more specifically, current, is supplied to the d-c brushes via wiring or leads 54-55 and from there to armature 38 which selectively applies current to windings 32, 34 and 36. An electromotive force is created in conjunction with the magnetic flux effected by magnets 52 and the motor operates at a predetermined operational speed.

Several aspects of motor 22, however, are to noted. Motor 22 exhibits a longitudinal axial dimension, or height, which is very short with respect to its circumferential dimension. In point of fact, the actual dimension is many times less than its diameter. In this way, a flat, low-profile motor is provided which may be accommodated in any present day radio pager whose space is at a decided premium. In this embodiment, as shown in FIGS. 2-6, motor 22 has a diameter of approximately one inch while the axial dimension (height) is on the order of only 3/16th of an inch.

In addition, motor 22 provides its required vibrating action without the need of any external, add-on, counterweight or other part. In the present instance, the vibration is provided by a deliberate, designed-in unbalance in rotor assembly 26. This is effected by making one of the windings, in this case, winding 32, smaller in size and weight than the other two. This unbalance then provides the desired vibration when rotor assembly 26 operates at its intended speed much as an automobile tire/wheel vibrates when not fully in balance.

Figure 6:
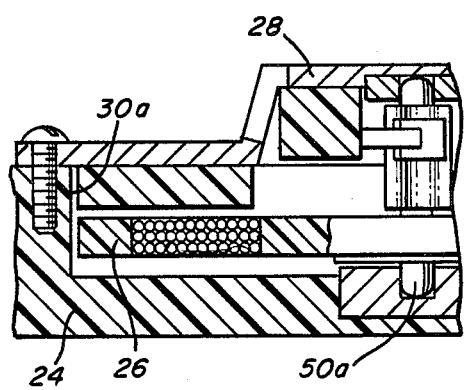
FIG. 6 is a cross-sectional view of the motor of FIG. 5 which utilizes a portion of the radio pager cover as part of its housing arrangement.

In mounting motor 22 to the back interior wall 24 of pager 20, the mounting may be effected by utilizing the entire housing 30, as shown in FIG. 5, or alternatively, a portion of the interior wall of the pager itself may serve to house motor 22 as depicted in FIG. 6. As therein illustrated, only the stator/cover 28 is required, together with rotor assembly 26. A molded cavity 30a is provided in back wall 24 of pager 20 with a bearing 50a in the bottom thereof to accommodate the shaft 40 of rotor assembly 26. In either mounting embodiment, the motor 22 is affixed to the back wall 24 of pager 20 and not to the associated printed circuit board or chassis which must necessarily include the myriad of solder connections and somewhat fragile electronic components. In this way, pager reliability is enhanced over its entire expected service life.

Figure 7:
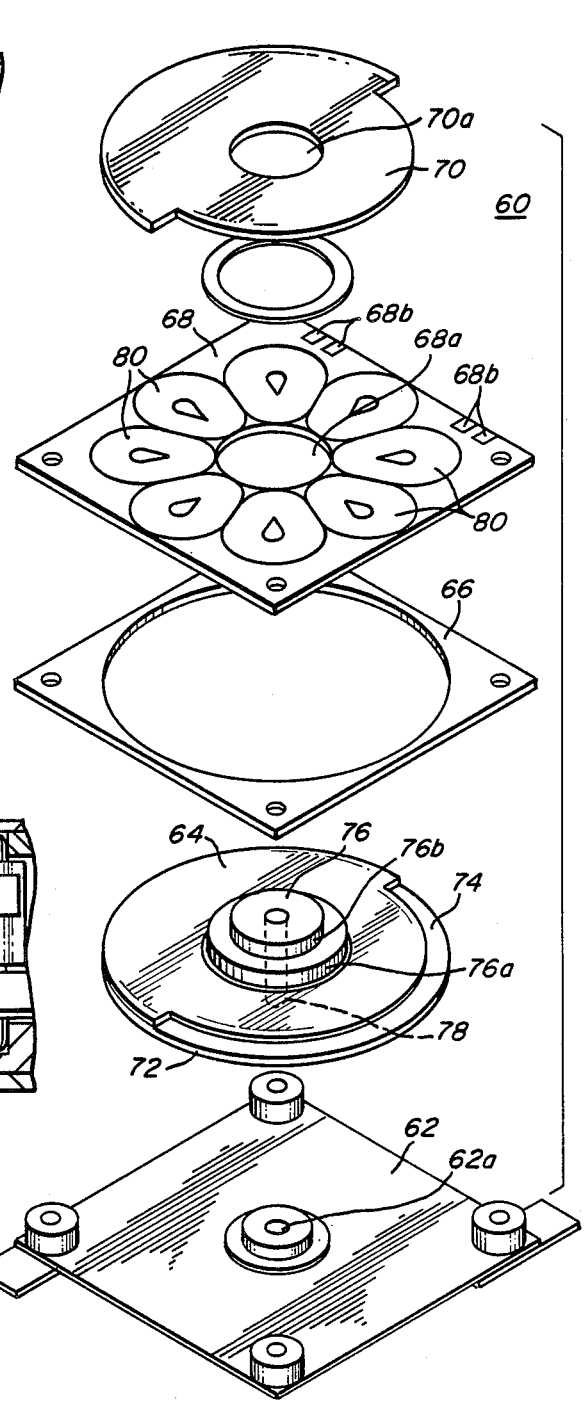
FIG. 7 an exploded view of another embodiment of the vibrating motor in accordance with the present invention.
Figure 8:
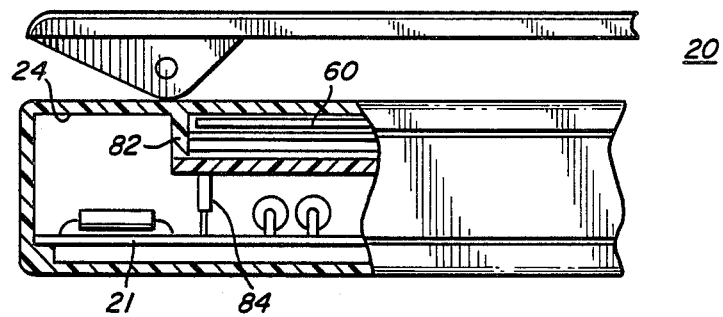
FIG. 8 is a cross-sectional view of the motor of FIG. 7 showing its attachment to the housing, and an associated acoustical housing and spring loaded contacts which connect it to the associated PC board.

A second embodiment for the vibrator motor is shown in FIGS. 7 and 8. In this case, the motor identified at 60 is of the brushless DC type. An exploded view is shown in FIG. 7. Motor 60 includes discrete elements comprising a support bracket or plate 62, a rotor assembly 64, spacer plate 66, printed circuit board 68 and top plate 70 serving as a back yolk. In this instance, the rotor assembly 64 is the component element that carries the permanent magnet(s) and the stationery PC board 68 serves as the stator that includes the electromagnetic windings. Rotor assembly 64 has a base plate or rotor yolk 72 on which a permanent magnet 74 is affixed. A pedestal 76 is included in a central location with a shaft 78 extending downwardly. Shaft 78 is a accommodated in a bearing 62a of support bracket 62.

Mounting pedestal 76 has a larger diameter at its base to accommodate the central opening 68a of PC board 68. Pedestal 76 further has a narrower diameter at the top portion thereof indicated at 76b which is designed to accommodate the opening 70a of back yolk 70. As will be noted, rotor yolk 72, permanent magnet 74 and back yolk 70 form the overall, rotatable rotor assembly 64. Printed circuit board 68 includes a plurality of electromagnetic windings 80 printed thereon on both top and bottom surfaces. PC board 68 serves as the stator assembly and is sandwiched in between permanent magnet 74 and back yolk 70. Connections to windings 80 are made by way of solder pads 68b.

It will be understood that motor 60 operates in an entirely conventional manner for motor devices of this type such that extensive detailed operational description should not be necessary. Timing signals are effected by a separate circuit (not specifically shown) which when selectively applied to the windings 80 of motor 60 cause an electromagnetic force to rotate rotor assembly 64 at a predetermined speed. The PC board 68 conventionally includes one or more Hall Effect sensing devices (not shown). The electromagnetic windings are designed to provide two phase, full wave drive brushless operation in conjunction with the Hall Effect sensors, the latter being used to ensure proper commutation of the two phases shifted 90 degrees apart electrically. A more detailed operational description may be found in various manufacturer's specification sheets for motors of these types and other sources. See for example, U.S. Pat. No. 4,633,149 issuing to R. E. Welterlin. Regarding the desired vibrating action to be generated by motor 60, it is provided by a designed-in unbalance of the rotor assembly 64. As will be noted, a portion of the permanent magnet 74 has been removed from around its periphery over approximately one-half of its circumference. To enhance the unbalance, a like portion is removed from the periphery of the back yolk 70. If further enhancement is needed or desired, part of the periphery could also be removed from the rotor yolk 72 of rotor assembly 64 as well.

Again, as in the case for the embodiment of the motor 22 in FIGS. 3–6, it is important to note that such vibratory action for motor 60 is effected with no external, add-on parts. The required unbalance is provided internal of motors 22 and 60 within constituent elements necessary to the basic, i.e., rotary operation of the motors themselves. Further motor 60 exhibits an even reduced axial dimension, or height, than that of motor 22. Motor 60 is approximately one inch in width but only 0.12 inches high, providing a very low-profile motor which will find advantageous application in any radio pager device.

Motor 60 is shown in cross-section in FIG. 8 mounted to the interior back wall 24 of radio pager 20 with an acoustic cover 82 enclosing it for enhanced noise reduction, if and where needed. As also shown, spring loaded contacts 84 are used to connect motor 60 to the associated printed circuit board chassis 21 of pager 20. Four such contacts are required for motor 60. The spring loaded contacts have two advantages. They absorb to a large extent the vibrating motion generated by motor 60 and prevent the same from being transferred to the PC board chassis 21, thereby significantly enhancing the reliability expectations for the radio pager 20 over its extended service life. Spring loaded contacts 84 also permit the mounting of motor 60 to the pager back covers so that such cover and motor assembly may be easily separated from the PC board chassis 21 and the rest of the radio pager 20, such as for servicing or the like, without the need for unsoldering of wiring or other disassembly. Further, contacts of this type when utilized permit vibrator motors, such as herein described, to be convenientlty added in the field, thereby avoiding factory-only availability. It will also be appreciated that acoustic cover 82 may be utilized in connection with motor 22 as well so as to provide the same enhanced sound abatement as provided with motor 60. In this case, only two spring loaded contacts 84 are required instead of the previous four for motor 60.

Accordingly, what is claimed is:

1. In a low volume electronic device such as a radio pager, a low-profile vibrator motor for effecting silent alerting, including in combination:
    rotor and stator means, said rotor means having a flat, pancake configuration with a longitudinal dimension substantially less than its lateral dimension and being rotatable with respect to said stator means;
    a plurality of electromagnetic windings positioned on a selective one of said rotor and stator means with permanent magnet means positioned on the other thereof;
    said rotor means being unbalanced so as to develop a substantial vibrating action when rotated at its intended operating speed; and
    means for substantially containing the magnetic flux from said permanent magnet means to within the interior of said motor.

2. A low-profile vibrator motor in accordance with claim 1 wherein said electronic device includes an interior back wall, said motor being mounted thereto.

3. A low-profile vibrator in accordance with claim 2 which further includes an acoustical cover positioned over said motor for effecting further noise abatement enhancement.

4. A low-profile vibrator motor in accordance with claim 2, further comprising an associated printed circuit board chassis, wherein said interior back wall mounted motor is connected to said associated printed circuit board chassis of said electronic device by spring loaded contacts that further serve to substantially absorb vibration generated by said motor and prevent the same from being transferred to said printed circuit board chassis.

5. In a low-volume radio pager device, a low-profile vibrator motor for effecting silent alerting, including in combination:
    a flat, rotatable rotor assembly having a longitudinal dimension substantially less than its lateral dimension, said rotor assembly having a flat disk encapsulating a plurality of electromagnetic windings and a centrally located armature on a shaft;
    said rotor assembly being unbalanced so as to create a substantial vibrating action when rotating at its intended operating speed,
    a stator assembly, said stator assembly having a flat disk configuration on which a plurality of permanent magnets are positioned together with electrical brushes for cooperating with said armature of said rotor assembly; and
    housing means for housing said rotatable rotor assembly and cooperating with said stator assembly to substantially contain the magnetic flux from said permanent magnets to within the interior of said motor.

6. A low-profile vibrator motor in accordance with claim 5 wherein said rotor unbalance is effected by at least one of said windings being substantially less in size and weight than the other windings.

7. A low-profile vibrator motor in accordance with claim 5 wherein said radio pager includes an interior back wall, said motor being mounted thereto.

8. A low-profile vibrator motor in accordance with claim 7 wherein said back wall of said pager includes a formed cavity which in cooperation with said stator assembly provides said housing means for said motor.

9. A low-profile vibrator motor in accordance with claim 6 which further includes an acoustical cover positioned over said motor for further noise abatement enhancement.

10. A low-profile vibrator motor in accordance with claim 7, further comprising a printed circuit board chassis, wherein said interior back wall mounted motor is connected to said printed circuit board chassis by spring loaded contacts that further serve to substantially absorb vibration generated by said motor and prevent the transfer of the same to said printed circuit board chassis.

11. In a low-volume radio pager device, a low-profile vibrator motor for effecting silent alerting, including in combination:
    a flat, rotatable rotor assembly having a longitudinal dimension substantially less than its lateral dimension, said rotor assembly including a bottom plate or yolk to which permanent magnet means is affixed together with a centrally located mounting pedestal and a top plate or back yolk mounted on said mounting pedestal;

said rotor assembly having an unbalance designed therein so as to create a substantial vibrating action when rotating at its intended operating speed, a stator assembly, said stator assembly comprising a printed circuit board having a plurality of electromagnetic windings printed thereon, said stator assembly printed circuit board being positioned on said mounting pedestal and sandwiched in between said permanent magnetic means and said rotor assembly top plate; and support means for mountably receiving said rotor and stator assemblies thereon and together with said top and bottom yolks of said rotor assembly containing the magnetic flux from said permanent magnet means to between said windings and said yolks.

12. A low-profile vibrator motor in accordance with claim 11, wherein said top and bottom rotor yolks and said permanent magnet means have a periphery and said rotor unbalance is effected by the removal of a portion of the periphery of at least one of said top and bottom rotor yolks and said permanent magnet means.

13. A low-profile vibrator motor in accordance with claim 11, wherein said motor is mounted to the interior back wall of said radio pager device.

14. A low-profile vibrator motor in accordance with claim 12, which further includes an acoustical cover over said motor for further noise abatement enhancement.

15. A low-profile vibrator motor in accordance with claim 12, further comprising a printed circuit board chassis, wherein said interior back wall mounted motor is connected to said printed circuit board chassis by spring loaded contacts that further serve to substantially absorb vibration generated by said motor and prevent the transfer of the same to said printed circuit board chassis.

16. A low profile vibrating motor comprising:
a shaft;
a rotor assembly rotatably coupled to said shaft and having a longitudinal dimension along said shaft less than its lateral dimension across the diameter of said rotor assembly, said rotor assembly being unbalanced so as to develop a substantial vibrating action when rotated at its intended operating speed;
a stator assembly coupled to said shaft;
magnet means; and
a plurality of electromagnetic windings positioned on one of said rotor and stator means and said magnet means positioned on the other.

* * * * *

(12) REEXAMINATION CERTIFICATE (4245th)

United States Patent
Tribbey et al.

(10) Number: US 4,864,276 C1
(45) Certificate Issued: Jan. 9, 2001

(54) VERY LOW-PROFILE MOTOR ARRANGEMENT FOR RADIO PAGER SILENT ALERTING

(75) Inventors: David A. Tribbey; Charles W. Mooney, both of Lake Worth; Thomas J. Rollins, Boca Raton, all of FL (US)

(73) Assignee: Motorola, Inc., Schaumburg, IL (US)

Reexamination Request:
No. 90/005,469, Aug. 31, 1999

Reexamination Certificate for:
Patent No.: 4,864,276
Issued: Sep. 5, 1989
Appl. No.: 07/202,331
Filed: Jun. 3, 1988

(51) Int. Cl.[7] ............................. H04B 3/36; G08B 3/00
(52) U.S. Cl. ...................... 340/407.1; 340/311.1; 340/825.46; 340/390.1; 340/398.1
(58) Field of Search ........................ 340/407.1, 825.46, 340/384.1, 390.1, 398.1, 391.1, 388.5; 455/90

(56) References Cited

U.S. PATENT DOCUMENTS

| | | | |
|---|---|---|---|
| 3,017,631 | * 1/1962 | Fink et al. ........................ | 340/407.1 |
| 3,618,070 | * 11/1971 | Kagan ............................... | 340/407.1 |
| 3,623,064 | * 11/1971 | Kagan ............................... | 340/392.2 |
| 3,911,416 | * 10/1975 | Feder ................................. | 340/340 |
| 4,352,091 | * 9/1982 | Yamasaki .......................... | 340/407.1 |
| 4,633,149 | 12/1986 | Welterlin .......................... | 318/254 |

FOREIGN PATENT DOCUMENTS

| | | |
|---|---|---|
| 49-4108 | 1/1974 | (JP). |
| 59-85072 | 6/1974 | (JP). |
| 51-21287 | 6/1976 | (JP). |
| 54-132720 | 3/1978 | (JP). |
| 55-139068 | 10/1980 | (JP). |
| 59-14966 | 4/1984 | (JP). |

* cited by examiner

Primary Examiner—Donnie L. Crosland

(57) ABSTRACT

A low-profile motor arrangement for accomodation in a low-volume electronic device such as a radio pager. The motor is designed to provide a vibrating action for silent alerting that does not require any additional add-on parts, but effects the required vibrator action by a designed-in unbalance in the rotating internal parts.

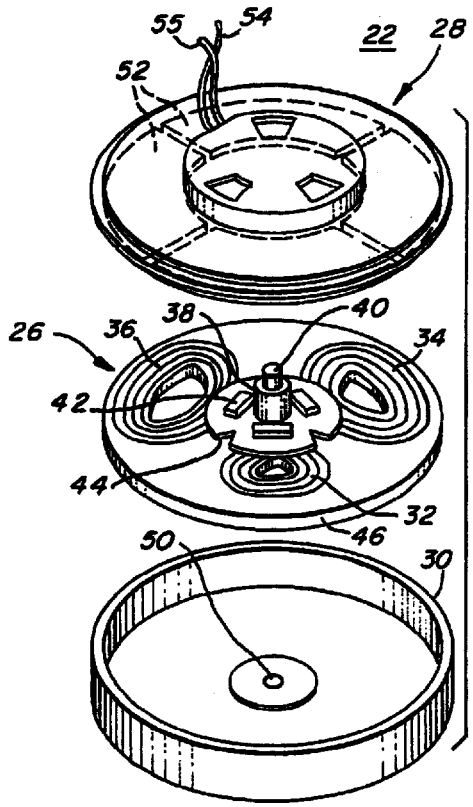

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 is confirmed.

Claim 16 is determined to be patentable as amended.

16. A low profile vibrating motor comprising:
a shaft;
a rotor assembly rotatably coupled to said shaft and having a longitudinal dimension along said shaft less than its lateral dimension across the diameter of said rotor assembly, and rotor assembly being unbalanced so as to develop a substantial vibrating action when rotated at its intended operating speed;
a stator assembly coupled to said shaft;
magnet means *positioned on said stator assembly*; and
a plurality of electromagnetic windings positioned on [one of] said rotor [and stator means and said magnet means positioned on the other], *wherein said rotor unbalance is effected by at least one of said plurality of electromagnetic windings being substantially less in size and weight than the other electromagnetic windings.*

\* \* \* \* \*